United States Patent [19]

Lingenfelter et al.

[11] 4,001,644
[45] Jan. 4, 1977

[54] SUDDEN PRESSURE RELAY HAVING SEISMIC PROTECTION

[75] Inventors: Robert C. Lingenfelter; Curtis L. Moore; James J. Kunes, all of Sharon, Pa.

[73] Assignee: Westinghouse Electric Corporation, Pittsburgh, Pa.

[22] Filed: Mar. 27, 1975

[21] Appl. No.: 562,617

[52] U.S. Cl. .................................. 317/14 G; 317/15
[51] Int. Cl.² ............................................ H02H 7/04
[58] Field of Search ............ 317/14 G, 14 R, 14 F, 317/14 J, 15; 200/83 R, 83 A, 83 C, 81 R, 81.5, 84 B

[56] References Cited

UNITED STATES PATENTS

| | | | |
|---|---|---|---|
| 2,169,857 | 8/1939 | Treanor | 317/14 G |
| 2,400,278 | 5/1946 | Wiseley | 200/84 B |
| 2,553,291 | 5/1951 | Barr | 317/14 G |
| 2,773,146 | 12/1956 | Sauer | 317/14 G |
| 3,358,605 | 12/1967 | Ayers | 200/81.5 X |
| 3,535,878 | 10/1970 | Romanowski | 200/83 R X |

Primary Examiner—J D Miller
Assistant Examiner—Patrick R. Salce
Attorney, Agent, or Firm—D. R. Lackey

[57] ABSTRACT

A relay which measures sudden increases in the pressure of gas located above the fluid dielectric in electrical apparatus. The relay includes defeating apparatus which prevents the operation of the sudden pressure relay when the sudden increase in gas pressure is caused by abrupt changes in the fluid level due to physical disturbances outside the apparatus enclosure. One arrangement includes a switch which is activated, when a float on the surface of the dielectric fluid is raised sufficiently, to prevent energization of the sudden pressure relay. Another arrangement uses two sudden pressure relays which are located at diagonally opposite corners of the apparatus tank and are serially connected so that both relays must be activated at the same time to energize the associated control or alarm circuits. Other arrangements use baffles and multiple opening tubes to prevent false activation of the sudden pressure relay by keeping the fluid away from the gas opening of the sudden pressure relay.

8 Claims, 7 Drawing Figures

SUDDEN PRESSURE RELAY HAVING SEISMIC PROTECTION

BACKGROUND OF THE INVENTION

1. Field of the Invention

This invention relates, in general, to protective devices for electrical apparatus and, more specifically, to sudden pressure relays for power transformers.

2. Description of the Prior Art

Sudden pressure relays are used in connection with electrical apparatus, such as power transformers, to detect when a sudden increase in gas pressure within the electrical apparatus enclosure has occurred. Normally, the gas space is located above the level of a fluid dielectric within the enclosure. These sudden increases in pressure are usually caused by an internal fault within the apparatus. Thus, the sudden pressure relay is generally connected to control and alarm circuits which are associated with the high-voltage circuits entering the electrical apparatus.

One conventional sudden pressure relay includes a pressure sensing bellows which is located in substantially unrestricted flow communication with the gas. The bellows is surrounded by a gas chamber which is connected to the gas in the apparatus enclosure through a pressure equalizing orifice. The orifice throttles rapid increases in gas pressure and keeps the pressure of the gas around the outside of the bellows below that of the gas on the inside of the bellows, thus allowing the bellows to expand. When the rate of gas pressure increase is slow, the gas pressure around the outside of the bellows increases as fast as the pressure on the inside of the bellows, therefore the bellows will not expand on slowly rising gas pressures.

Sudden pressure relays of the type described cannot differentiate between a sudden increase in gas pressure as a result of internal faults and a sudden increase in gas pressure caused by excessive splashes and waves occurring in the fluid level due to large physical disturbances originating outside the apparatus enclosure. Such disturbances are known to occur during seismic or earthquake conditions. However, since it is not usually desirable for the sudden pressure relay to erroneously indicate an internal fault under seismic conditions, conventional sudden pressure relays may not be desirable for use where seismic disturbances are expected. Therefore, it is desirable, and it is an object of this invention, to provide sudden pressure relays which will not be activated by seismic disturbances.

SUMMARY OF THE INVENTION

There are disclosed herein new and useful sudden pressure relays which include apparatus for bypassing the activating switch in the sudden pressure relay when the rapid increase in gas pressure causing activation of the switch is a result of seismic disturbances originating outside the associated electrical apparatus enclosure. In one arrangement, the activating switch of the sudden pressure relay is connected in series with another switch which is coupled to a float which rises with a rise in the fluid level. If the fluid level rises appreciably as a result of an external disturbance, the float activated switch is opened to prevent the energization of a circuit by the gas pressure sensitive switch assembly of the sudden pressure relay.

Another arrangement uses two identical sudden pressure relays located at diagonally opposite corners of the electrical apparatus enclosure. The activating switches of the two sudden pressure relays are connected in series so that both switches must be activated at the same time to energize the associated circuit. With gas pressure increases caused by internal faults, both relays would operate together and the associated circuit would be energized. Under seismic conditions, the shape of the fluid surface is such that, if the fluid level rises in one corner, the fluid level will be lowered in the other corner, thus both relays will not operate simultaneously.

A third arrangement uses an array of tubes connected to the inlet opening of the bellows in the sudden pressure relay. The tubes are hollow and the ends of the tubes extend to different regions in the gas space contained within the apparatus enclosure. Since the fluid will not cover all of the openings simultaneously during a seismic condition, any fluid forced into one opening by a fluid dielectric wave will not substantially increase the gas pressure in the tubes since at least some of the other ends of the tubes are not blocked with fluid. With an internal fault, the pressure increase is transferred through every opening simultaneously.

The last arrangement described in the specific embodiments of the invention utilizes a strainer or container which has a plurality of small openings. The container is located between the opening to the sudden pressure relay bellows and the gas above the fluid dielectric. The openings are dimensioned to allow a substantially unrestricted flow of gas therethrough without allowing a sufficient amount of fluid through the openings to increase the pressure on the inside of the container.

BRIEF DESCRIPTION OF THE DRAWING

Further advantages and uses of this invention will become more apparent when considered in view of the following detailed description and drawing, in which.

DESCRIPTION OF THE PREFERRED EMBODIMENTS

Figure 1:
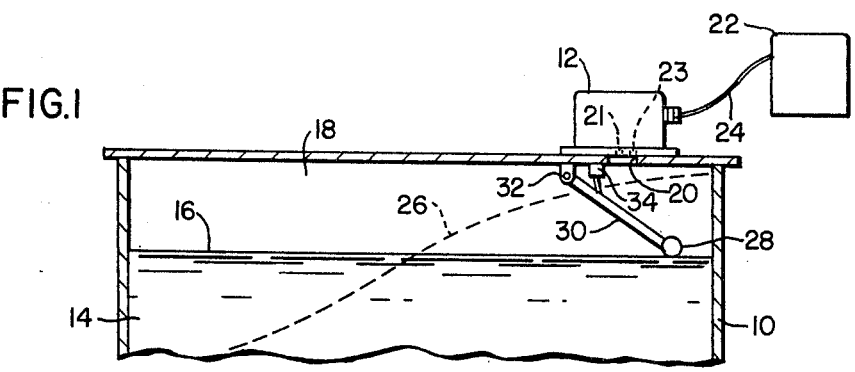
FIG. 1 is a view illustrating an electrical apparatus enclosure having a sudden pressure relay constructed according to one embodiment of this invention.

Throughout the following description, similar reference characters refer to similar elements or members in all of the figures of the drawing.

Referring now to the drawing, and to FIG. 1 in particular, there is shown an electrical apparatus enclosure 10 having a sudden pressure relay 12 located on the top thereof. The enclosure 10 contains a fluid dielectric 14 which normally maintains a fluid surface level 16. The electrical apparatus surrounded by the fluid dielectric 14 and by the apparatus enclosure 10 is not illustrated in FIG. 1.

The sudden pressure relay 12 may be constructed similar to conventional sudden pressure relays which are presently available and the operation of which is known to those skilled in the art. Briefly, the sudden pressure relay 12 includes an expandable bellows which is connected in flow communication, through the openings 20 and 21, with the gas space 18 located above the fluid dielectric 14. An orifice 23 is positioned between the gas space 18 and the space within the sudden pressure relay enclosure which surrounds the expandable bellows. The orifice throttles sudden increases in pressure within the gas space 18 and maintains a lower pressure on the outside of the bellows than on the inside of the bellows. Thus, under sudden pressure changes, the bellows expand and energizes a switch which is coupled to the bellows. The box 22 is illustrative of the control or alarm circuit which is generally associated with a sudden pressure relay, and is connected thereto by the cable 24.

When outside disturbances agitate the fluid dielectric 14 within the apparatus enclosure 10, it is possible for the fluid level to change appreciably from the location of the fluid level 16 illustrated in FIG. 1. It has been found that, under seismic conditions caused by earthquake disturbances, a fluid level generally approaching the shape of the level 26 may occur. The rapidly changing fluid level 26 increases the gas pressure in the region immediately below the opening 20 of the sudden pressure relay 12, especially when the fluid dielectric level 26 rises completely to the opening 20. Although this increase in gas pressure is not characteristic of the pressure in the overall gas space above the fluid dielectric level, conventional sudden pressure relays are unable to distinguish between a localized gas pressure increase in the vicinity of the opening thereto and a general gas pressure increase over the entire fluid dielectric level. Thus, conventional sudden pressure relays are susceptible to false operation under seismic conditions.

The sudden pressure relay embodiment shown in FIG. 1 includes a float 28 which is connected to the arm 30 which pivots around the pin 32. When the fluid level 16 rises, the float 28 rises and operates the switch 34. The switch 34 is connected to the circuitry of the sudden pressure relay, and to the circuits associated therewith, to prevent false indications by the sudden pressure relay 12. The amount of float rise necessary to energize the switch 34 would normally be greater than the amount of fluid dielectric rise under normal and overload operating conditions. In addition, the placement and adjustment of the switch 34 would normally be such that it would not be energized until the fluid level position rises sufficiently to at least present the possibility of locally compressing the gas near the opening 20 and activating the sudden pressure relay 12. Thus, with the arrangement shown in FIG. 1, when the sudden pressure relay 12 is subjected to localized gas pressure increases in the vicinity of the opening 20 due to a rapid increase in fluid level in this region, the control circuits of the sudden pressure relay 12 will be defeated by the switch 34 to prevent activation of the associated circuitry.

Figure 2:
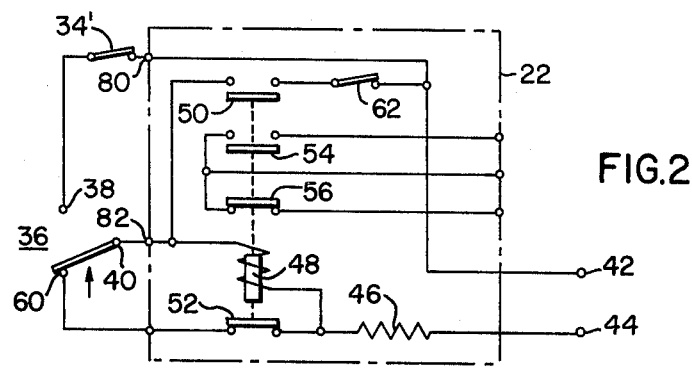
FIG. 2 is a diagram of a circuit which may be used with the embodiment shown in FIG. 1.

FIG. 2 is a view illustrating a sudden pressure relay circuit and part of the control or alarm circuitry associated therewith which may be used in conjunction with the switch 34 to provide the defeating action when the float 28 is raised sufficiently. The pressure sensitive switch 36 is shown in the position maintained when the relay does not sense a sudden increase in pressure. When a sudden increase in pressure occurs, the expandable bellows moves the switch 36 into a position which connects together the terminals 38 and 40. If this occurs under normal sudden pressure increase conditions, such as those caused by internal faults, the contacts 34' of the switch 31 remain closed as shown in FIG. 2. Thus, a relay voltage applied to the terminals 42 and 44 is applied, through the switch contacts 34', the switch 36, and the current limiting resistor 46, to the relay coil 48.

The contacts 50, 52, 54 and 56 are controlled by the relay coil 48. Thus, when the coil 48 is energized, the contacts 50 are closed to provide a holding circuit through the relay coil 48 for keeping the coil 48 energized when the pressure sensitive switch 36 disconnects the terminals 38 and 40. The contacts 54 and 56 are connected to the associated control, alarm, or signalling apparatus. The contacts 52 are closed when the relay coil 48 is not energized for the purpose of providing a short-circuit path around the relay coil 48 when the switch 36 connects together the terminals 40 and 60. This prevents the development of any voltage across the relay coil 48 due to large electric fields in the vicinity of the apparatus. The reset switch 62 provides means for deenergizing the relay coil 48 after a sudden pressure rise has been detected and the coil 48 has been energized. In many applications, the switch 62 must be moved manually.

When the fluid level within the apparatus enclosure rises to a sufficient level to energize the switch 34, the switch contacts 34' open and prevent the energization of the relay coil 48 when the pressure sensitive switch 36 connects together the terminals 38 and 40. Although the circuit shown in FIG. 2 is illustrative of a circuit which may be used with the switch 34 to defeat the action of the sudden pressure relay 12, other circuits providing the same function may be used within the contemplation of this invention.

Figure 3:
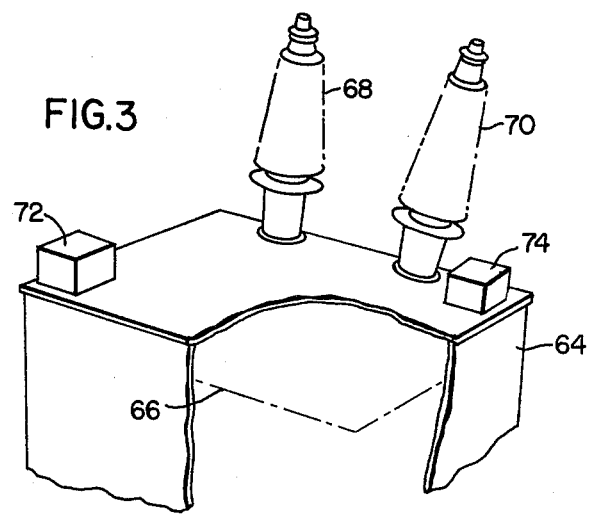
FIG. 3 is a view illustrating an electrical apparatus enclosure having a sudden pressure relay arrangement constructed according to another embodiment of the invention.

FIG. 3 is a view illustrating another embodiment of the invention which may be used to make sudden pressure relay indications independent of usual seismic fluid level disturbances. In FIG. 3, the apparatus enclosure 64 includes a fluid dielectric which normally maintains the fluid level 66. The bushings 68 and 70 are mounted on top of the apparatus enclosure 64 in a manner which would be normal when the apparatus enclosure 64 contains power transformer components. The sudden pressure relays 72 and 74, which may be constructed generally similar to each other, are mounted on top of the apparatus enclosure 64 at diagonally opposite corners. Although not shown in FIG. 3, interconnecting cables and associated control and alarm circuits would normally be connected to the sudden pressure relays 72 and 74. In addition, the positioning of the sudden pressure relays 72 and 74 at diagonally opposite corners of the apparatus enclosure 64 may be modified within the contemplation of the invention, as long as a spaced relationship exists between the two sudden pressure relays. However, the arrangement shown in FIG. 3 is considered a preferred embodiment of the invention.

It has been found that, under normal seismic conditions, the fluid level 66 acquires a higher level in one portion of standard sized apparatus enclosures while acquiring a lower level in another portion of such enclosures. Indications are that the fluid level will be lower in one corner of the enclosure when it is higher in the diagonally opposite corner of the enclosure. Therefore, under seismic conditions, the sudden pressure relays 72 and 74 will not be activated simultaneously. By suitable interconnecting of the sudden pressure relays 72 and 74, suitable control of the associated circuitry can be achieved.

Figure 4:
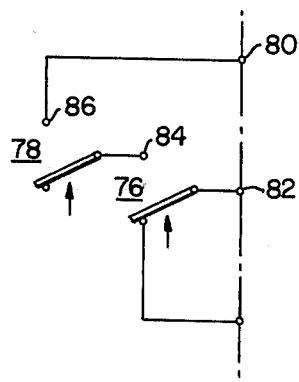
FIG. 4 is a view illustrating a portion of the circuit shown in FIG. 2 which may be modified for use with the embodiment shown in FIG. 3.

FIG. 4 shows one specific arrangement of interconnecting sudden pressure relays which makes it necessary that both sudden pressure relays be activated simultaneously in order to activate the associated control and alarm circuitry. FIG. 4 illustrates that portion of the circuit of FIG. 2 which would be changed to provide the desired interconnection between two sudden pressure relays. The pressure sensitive switch 76 is contained within the sudden pressure relay 72, and the pressure sensitive switch 78 is contained within the sudden pressure relay 74. In order to provide a circuit path between the terminals 80 and 82 which is necessary to activate the relay coil and the control circuitry, the pressure sensitive switches 76 and 78 must both be operated simultaneously. When this occurs, the circuit is closed between the terminals 80 and 82, the relay coil of the sudden pressure relay control circuitry is energized, and the holding circuit is completed therearound.

Since sudden pressure increases due to internal faults within the apparatus enclosure would normally increase the gas pressure equally at both sudden pressure relays, the switches 76 and 78 would be energized simultaneously to correctly indicate a sudden pressure increase of the gas above the fluid dielectric in the apparatus enclosure. However, when one sudden pressure relay is activated by a localized gas pressure condition adjacent to that sudden pressure relay, the other sudden pressure relay will not be activated and the control circuitry associated therewith will not be activated and a false indication or control will be avoided.

Figure 5:
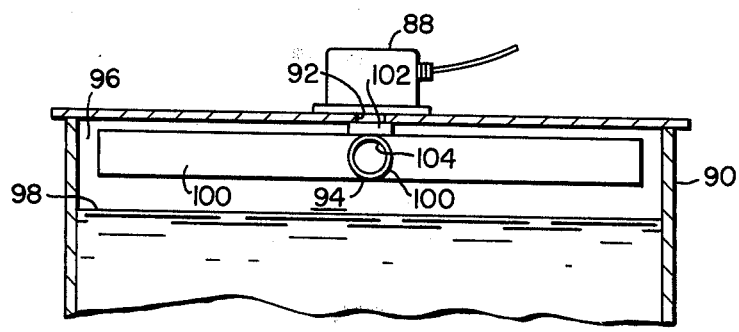
FIG. 5 is a view illustrating an electrical apparatus enclosure having a sudden pressure relay constructed according to another embodiment of the invention.

FIG. 5 is a view illustrating another embodiment of the invention which makes a sudden pressure relay insensitive to localized gas pressure increases due to fluid dielectric level disturbances caused by seismic conditions. In FIG. 5, the sudden pressure relay 88, which may be constructed of conventional design, is mounted on top of the apparatus enclosure 90. The opening 92, which provides access to the bellows and the orifice of the sudden pressure relay 88, is connected to the array of tubes 94 which extend into different portions of the gas space 96 located above the fluid level 98. The tubing array 94 includes a plurality of hollow cylindrical longitudinal members, or tubes 100, which are connected to each other and to the tube 102. The tubes 100 contain openings, such as the openings 104, through which the gas and fluid dielectric at the ends of the tubes 100 may pass.

When the pressure of the gas above the fluid level 98 is increased substantially uniformly throughout the gas space 96, the pressure transmitted to the opening 92 is substantially equal to the pressure within the gas space 96, since the openings 104 and the diameter of the tubes 100 are sufficiently large enough to prevent any resistance to the flow of gas to the opening 92. However, when one of the openings 104 is effectively submerged in the fluid dielectric due to an increase in the fluid dielectric level 98 caused by seismic conditions, the gas contained within the corresponding tube 100 is pushed to another opening of the tubular array 94. Since normal seismic fluid level disturbances would leave at least one of the openings 104 above the fluid level 98, gas travelling through one of the tubes 100 would flow freely out this opening rather than being compressed and increasing the pressure in the region of the opening 92. That is to say that, under gas pressure increases due to internal faults, the pressure buildup is equal at all of the openings, thus there is not any path for escape of the pressurized gas and an increase in pressure at the opening 92 results. When the increase in gas pressure occurs at less than the total number of openings 104, the gas tends to flow to an unrestricted opening rather than being compressed and forming a high pressure area in the region of the opening 92 to activate the sudden pressure relay 88.

Figure 6:
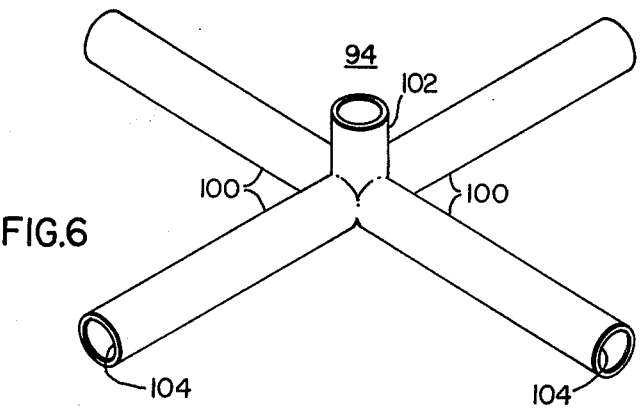
FIG. 6 is a view illustrating, in more detail, the arrangement of the tubes shown in FIG. 5.

The position of the sudden pressure relay 88 on the apparatus enclosure 90 may be varied from that shown in FIG. 5 without departing from the scope of this invention. In a preferred embodiment of this invention, the tubing array 94 may be cross-shaped as shown in FIG. 6 with one of the openings 104 located substantially in each corner of the apparatus enclosure. With such an arrangement, it would be very unlikely that the shape of the fluid level during seismic conditions would be such that all four of the openings would be submerged at the same time. Other configurations for the tubing array 94 may be used to provide a plurality of openings which normally would not all be submerged simultaneously in the fluid dielectric during seismic conditions.

Figure 7:
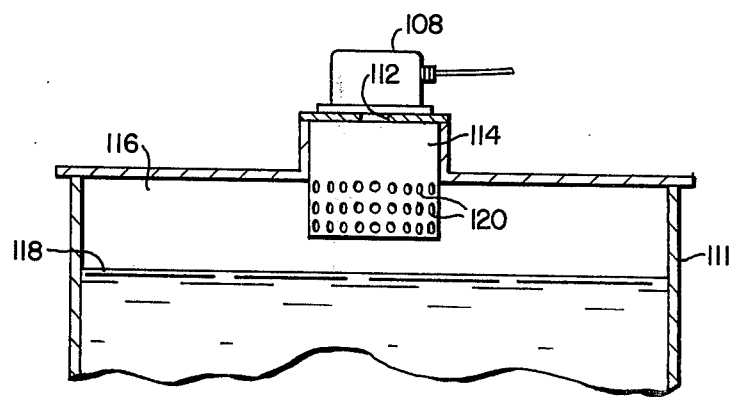
FIG. 7 is a view illustrating an electrical apparatus enclosure having a sudden pressure relay constructed according to still another embodiment of the invention.

FIG. 7 is a view illustrating another embodiment of the invention. In FIG. 7, the sudden pressure relay 108, which may be constructed according to conventional design, is attached to the top of the apparatus enclosure 111. The opening 112 to the sudden pressure relay 108 is surrounded by a drum or container 114. The container 114 extends into the gas space 116 above the fluid level 118 and contains a plurality of small openings 120. The openings 120 are small enough to prevent any quick passage of the fluid dielectric therethrough but are large enough to permit quick passage of the gas from the gas space 116. Thus, any sudden increase in gas pressure distributed equally around the surface of the container 114 would cause a corresponding increase in gas pressure in the region of the opening 112. However, splashing of the fluid dielectric against the container 114 as the fluid level 118 changes during seismic conditions will not cause a sufficient increase in gas pressure at the opening 112 to activate the sudden pressure relay 108.

The fluid dielectric is prevented from entering the container 114 quickly, thus the fluid dielectric is maintained a sufficient distance away from the opening 112 to prevent any localized gas pressure increase in the region of the opening 112. Also, the wave nature of the dielectric level 118 under seismic conditions would make it highly unlikely that all of the openings in the container 114 would be submerged in the fluid dielectric at the same time. Thus, any effects of a localized gas pressure increase in the region of any submerged openings 120 would be diminished by the remaining openings 120 which are not submerged in the fluid dielectric, since they would permit the gas to flow through the container 114 rather than being compressed therein.

Since numerous changes may be made in the abovedescribed apparatus, and since different embodiments of the invention may be made without departing from the spirit thereof, it is intended that all of the matter contained in the foregoing description, or shown in the accompanying drawing, shall be interpreted as illustrative rather than limiting.

We claim as our invention:

1. Stationary electrical apparatus having a tank containing a fluid dielectric with a gas space located above the level of the fluid dielectric,
    a sudden pressure relay system including detecting means for detecting a sudden increase in gas pressure within the tank and activating a circuit in response thereto, said detecting means including means for making the detecting means insensitive to relatively slow increases in gas pressure within the tank and
    defeating means for preventing activation of said circuit by the detecting means when the sudden increase in gas pressure is caused by an abrupt change in the dielectric level due to a seismic disturbance.

2. The stationary electrical apparatus of claim 1 wherein the defeating means includes means for detecting the level of the fluid dielectric in the tank.

3. The stationary electrical apparatus of claim 2 wherein the means for detecting the dielectric level comprises a float assembly positioned near the detecting means, and a switch, said float assembly being operatively coupled to said switch, said switch being connected to prevent activation of the circuit by the detecting means when operated by said float assembly in response to the dielectric level being above a predetermined value.

4. A sudden pressure relay system for activating a circuit, comprising:
    a tank containing a fluid dielectric with a gas space located above the level of the fluid dielectric,
    at least a first detecting means for detecting a sudden increase in gas pressure within the tank, said detecting means including means for making the detecting means insensitive to relatively slow increases in gas pressure within the tank, and
    defeating means for preventing activation of a circuit by the detecting means when the sudden increase in gas pressure is caused by abrupt changes in the dielectric level due to physical disturbances outside the tank,
    said defeating means comprising a second detecting means for detecting a sudden increase in gas pressure within the tank,
    said second detecting means including means for making the second detecting means insensitive to relatively slow increases in gas pressure within the tank,
    said second detecting means being positioned on the tank in spaced relationship with the first detecting means, with each detecting means connected together in such a relationship that the circuit will not be activated unless both detecting means detect a sudden increase in gas pressure at substantially the same instant.

5. The sudden pressure relay system of claim 4 wherein the first and second detecting means include bellows activated switches connected in series.

6. A sudden pressure relay system for activating a circuit, comprising:
    a tank containing a fluid dielectric with a gas space located above the level of the fluid dielectric,
    at least a first detecting means for detecting a sudden increase in gas pressure within the tank, said detecting means including means for making the detecting means insensitive to relatively slow increases in gas pressure within the tank, and
    defeating means for preventing activation of a circuit by the detecting means when the sudden increase in gas pressure is caused by abrupt changes in the dielectric level due to physical disturbances outside the tank,
    said defeating means including at least a first hollow longitudinal member with an opening at each end thereof, with the opening through said member being connected in flow communication relationship with the first detecting means.

7. The sudden pressure relay system of claim 6 wherein the defeating means includes a second hollow longitudinal member having an opening at each end thereof, with the opening through said second member being connected in flow communication relationship with the first detecting means, with each opening in the first and second members located in a different region of the tank.

8. A sudden pressure relay system for activating a circuit, comprising:
    a tank containing a fluid dielectric with a gas space located above the level of the fluid dielectric,
    at least a first detecting means for detecting a sudden increase in gas pressure within the tank, said detecting means including means for making the detecting means insensitive to relatively slow increases in gas pressure within the tank, and
    defeating means for preventing activation of a circuit by the detecting means when the sudden increase in gas pressure is caused by abrupt changes in the dielectric level due to physical disturbances outside the tank,
    said defeating means including a container disposed between the first detecting means and the gas space,
    said container including a plurality of small openings in the surface of the container which effectively permit rapid passage of gas through the container and prevent rapid passage of the fluid dielectric through the container.

* * * * *